Sept. 1, 1964   C. L. DONELSON ETAL   3,146,687
DEVELOPING APPARATUS
Filed Dec. 5, 1960   5 Sheets-Sheet 1

INVENTORS
PETER BETTS
BY CLARIS L. DONELSON

ATTORNEY

3,146,687
DEVELOPING APPARATUS
Claris L. Donelson and Peter Betts, San Jose, Calif., assignors to International Business Machines Corporation, New York, N.Y., a corporation of New York
Filed Dec. 5, 1960, Ser. No. 73,625
2 Claims. (Cl. 95—1.7)

This invention relates to apparatus for rendering visible or "developing" invisible charge distribution patterns on a surface and is of particular utility in developing the invisible electrostatic charge patterns in the field of xerography.

In xerographic systems an invisible or latent electrostatic charge pattern can be formed upon a surface of photoconductive insulating material, such as amorphous selenium of utilization in photographic systems such as the copying of documents, and reproduction and projection of radar scope patterns. In all these xerographic systems, a photoresponsive surface is used which will hold an electrostatic charge while it remains in darkness but which is discharged when exposed to light. Therefore, to record a document onto this surface as an invisible electrostatic charge pattern, the photoresponsive surface is first given a uniform electrostatic charge followed by exposure to light reflected from a document; since the black areas (printing) on the document absorb the light projected onto the document, corresponding areas on the photoresponsive surface will not be discharged. The white areas on the document will reflect light thereby discharging their counterparts on the surface with the results that the surface will have been prepared with an invisible electrostatic charge distribution pattern representative of the printing on the document.

It is ordinarily desirable in these systems to develop these invisible patterns so that they are visible to the human eye. Customarily, this has been done by applying to the photoresponsive surface a microscopic, finely divided powder or dust referred to as "toner". One effective way for achieving this has been to mix the toner with small beads so that the toner coats the beads. The beads, then, are cascaded across the surface which has received the latent electrostatic charge pattern thereon. As the beads travel across the surface, the toner is transferred from the beads to the photoconductive surface under action of the electrostatic attractive force of the charge pattern. When there is no charge pattern on the surface, the toner does not adhere to it, but is retained on the beads. Thus, the latent electrostatic charge is developed by the toner adhering in the same configuration as the charge pattern itself. Further explanation of this procedure is to be found in the U.S. patent to C. F. Carlson, 2,297,691.

To erase the developed powder image, it is conventional first to dissipate the electrostatic charge and then dislodge the particles by a combination of mechanical contact and triboelectric action. Dissipation of the charge on the entire surface can be easily accomplished by flooding it with light. It has been found, however, that the pattern does not automatically fall apart. Therefore, since the toner pattern tends to retain the configuration of the electrostatic pattern even after the charge has been dissipated, the carrier beads are again cascaded across the surface. This subsequent cascading of the mixture of particles and beads across the developed pattern supplies the combined mechanical and electrostatic effect noted above. With the charge in the surface having been dissipated, the toner will show a stronger "triboelectric" attraction to the beads than to the image surface. This is explained by the fact that any material placed in contact with another material, which is below it in what is known as the triboelectric series, will become positively charged and the material below it in the series will become negatively charged. For example, if a positively charged electrostatic image is to be developed, a toner powder is selected which is below the carrier bead material in the triboelectric series. The toner will then become charged to a negative polarity by contact with the beads and will be deposited upon the positively charge image by electrical attraction. However, if the image has been discharged, the attraction of the toner for the beads is the greater. Thus, as the beads roll through the developed pattern they will attract toner therefrom.

It has been found that several cascadings of the beads are required in order to effect a satisfactory erasure of the toner pattern. On the other hand, only a single pass of the carrier beads across the surface is sufficient to develop the pattern initially. Consequently, any system employing the development and erasure of a toner image on a surface will normally spend considerably more time erasing an image than in developing it. Thus, it is an object of the present invention to provide an apparatus of the kind described wherein the time required for erasing such developed images is eliminated from the duration of a cycle of operation.

According to the present invention, a number of separate areas are designated on a single surface oriented for rotation and disposed at a substantial slant to the horizontal. Each area is able to receive and hold an electrostatic charge pattern thereon. One after another of these areas goes through a complete photographic cycle of being charged, exposed, developed and flooded with light. The arrangement is such that during the time any one area is going through this cycle, the others pass through an erase step. Consequently, by the time each new photographic cycle is ready to commence, there is a fully erased image area ready to enter the cycle. In short, the problem outlined above relative to the long erasing time has been overcome by an arrangement which permits erasing of some image areas to take place during the time that a given image area is being prepared as a toner-developed pattern. Therefore, it is another object of this invention to provide an image development apparatus which erases some powder images while developing another.

Where cascading of carrier beads across a photoconductive surface has been used to develop the surface, it has been more or less conventional to rock the surface back and forth across the horizontal. This has required a relatively large space as well as the necessary controls to provide this function. In the preferred embodiment of the present invention this rocking movement is eliminated with a commensurate simplification of the apparatus and reduction in the space required.

Therefore, it is an object of the present invention to provide a developing apparatus which does not rock the photoconductive surface back and forth but which moves it in substantially its own plane thereby simplifying the apparatus as well as reducing its overall space requirement.

Furthermore, according to one aspect of the present invention a smooth unidirectional drive mechanism and simple control arrangement can be used to operate the image developing apparatus in lieu of the more awkward mechanisms of the rocking approach. Therefore, another object here is to provide a smoothly operating developing apparatus.

In the xerographic art, it is to be appreciated that a substantially uniform electrostatic charge is applied initially to the surface prior to creating the image pattern thereon. The necessity for uniformity will be immediately apparent when it is understood that the powder adheres by electrostatic attraction to each small area in inverse relation to the extent to which the electrostatic charge in the area has been dissipated by exposure to light. The developed image thus consists of a powder-density distribution over the selenium surface. In short where there is a strong electrostatic charge, a considerable amount of powder will adhere to the surface, and vice versa. Thus, in apparatus of this kind it is important that the pre-exposure charge applied initially to the surface be substantially uniform.

In the prior art where rectangular plates are used to receive one single charge pattern, uniform charging has been done by moving the surface under a single so-called Corona discharge wire impressed with a high voltage. However, in the present arrangement a disk is utilized and it will be observed that the linear speed of the disk near the center is much slower that the linear speed of the disk at its periphery. Therefore, a unit area on the surface of the disk near the center will spend longer under the charging wire than a unit area near the circumference of the disk. Consequently, a higher charge concentration will be applied to those portions of the disk nearer the center. In order to compensate for this unequal charge distribution, a feature of this invention is the provision of a Corona discharge wire oriented at an angle to the plane of the disk to compensate for the foregoing differential.

While it has been explained above that the image area most recently used is not immediately reused in the next subsequent cycle so as to erase it during the processing of another image area, it is necessary to position each developed image rather precisely at a utilization station to use it, for example, in viewing or projecting the developed powder image. A feature of the present invention is that its construction provides excellent registration of such a developed image with respect to a utilization station. Further, by not immediately reusing the same image area these areas have a chance to "rest" or "recuperate" from the fatiguing effects of reusing the same area in a quick succession of exposures to some radiant energy wavelengths such as is particularly noticeable when using ultraviolet light.

The foregoing and other objects, features and advantages of the invention will be apparent from the following more particular description of a preferred embodiment of the invention, as illustrated in the accompanying drawings.

In FIGS. 1 through 5 it is to be understood that for purposes of clarity in illustration light-tight covers have not been shown. However, in normal usage the structures shown in these figures would be arranged to operate in darkness.

Briefly stated, according to the present invention, a photoconductive insulating surface is provided. On this surface is a plurality of designated areas, each adapted to receive a latent electrostatic pattern thereon. The surface is mounted at a substantial angle (preferably around 30° to the horizontal—note FIG. 3) and a lip or rim is provided which retains xerographic toner and carrier beads on the surface. Since the surface is on a slant the beads will have a natural tendency to gravitate to the lowermost point of the surface. Rotation of the surface, however, will carry these beads by friction upwardly to a point where they commence to tumble backward by gravity. In this manner, rotation of the surface will cascade and agitate the beads continually across a portion of the surface as it is driven. Thus, if an area of the surface is first prepared with a latent electrostatic charge pattern, the pattern will be developed by adhesion of the toner particles to the electrostatic pattern moving through the accumulation of beads. On the other hand, if the surface area passing under the carrier beads has been previously developed and substantially flooded with radiant energy (as in projecting the developed image onto a viewing screen), the electrostatic charge on the surface having been dissipated, the toner particles remaining on the surface will be dislodged by the carrier beads when they are again cascaded across the surface.

Further, in accordance with the invention, the rotatable surface is arranged to be driven through a cycle of 360° plus an additional predetermined indexing movement sufficient to cause a fresh area to be entered into the charging, exposure and development cycle. In this manner, after a particular area has been used, it is erased by being passed through the accumulated carrier beads several times before it again enters the development cycle. As a result, there is always a fresh area of the photoconductive surface ready to receive a charge distribution pattern thereon and the erase time does not delay the operation. The "additional" predetermined indexing movement can be either added to or subtracted from the 360° cycle without departing from the invention. Therefore, the term "additional" is used herein in the algebraic sense of including "addition" of a negative or reverse movement.

Figures 1, 2, 3:
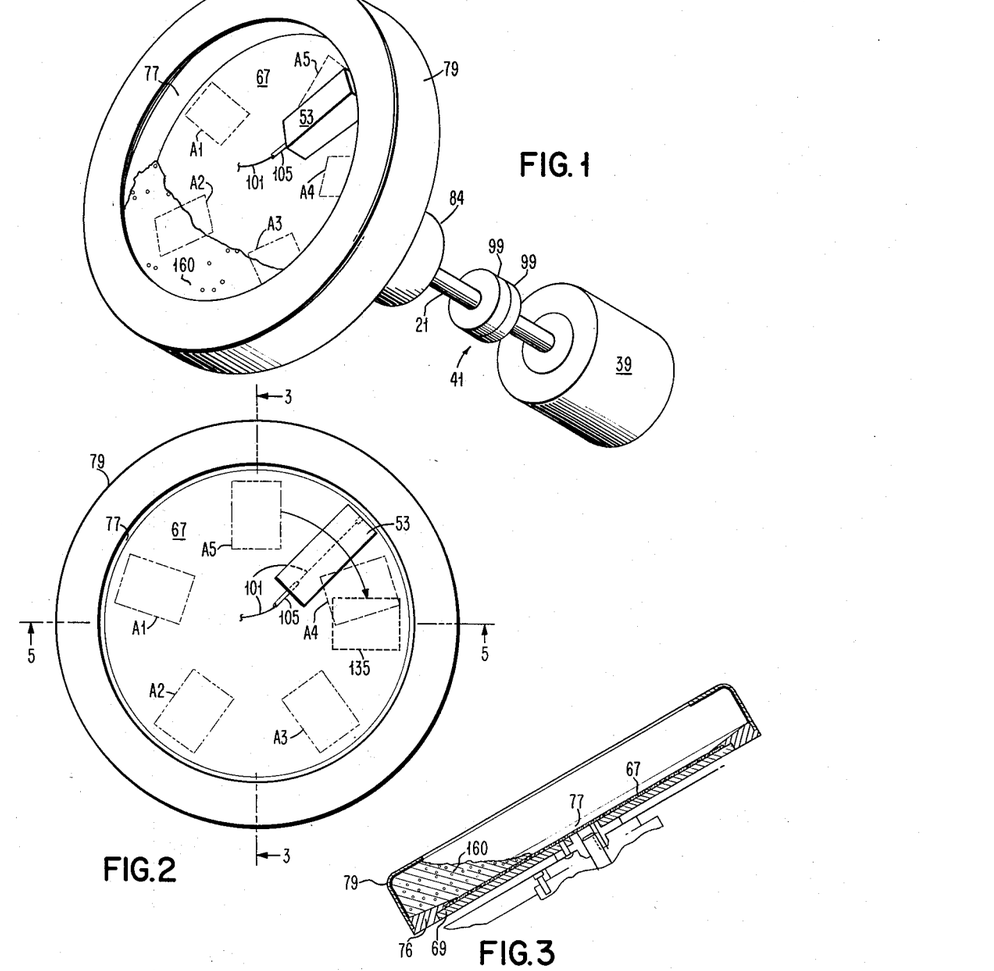
FIG. 1 is a perspective schematic view of the invention.
FIG. 2 is a plan view of the image plate and retaining rim of the invention showing five image areas A1–A5 thereon.
FIG. 3 is a side elevation center line section view of a portion of the invention taken along the line 3—3 of FIG. 2

Referring to the drawings, the general arrangement of the invention is shown in FIG. 1. However, since the operation of the invention includes a 360° photographic cycle plus means for selectively indexing each successive cycle to commence with a different image area, it is believed that an understanding of the overall invention will best be appreciated by first explaining the cycle indexing control coupling shown in FIGS. 7 and 7A.

*Cycle Index Control Coupling*

A cylindrical housing 31 has been provided encircling a hub 23 mounted on a shaft 21. Generally speaking, the outside of cylindrical housing 31 relates to the control and registration of the 360° photographic cycle while the inside provides the indexing movement requisite to commence each photographic cycle successively with a fresh image area. Briefly, inside housing 31 five index pins 27 coact with a hole 33 to establish the starting point (i.e. a selected image area) for each photographic cycle, while the photographic cycle itself is controlled by cam surfaces formed on or secured to the exterior of housing 31.

Figures 7, 7A:
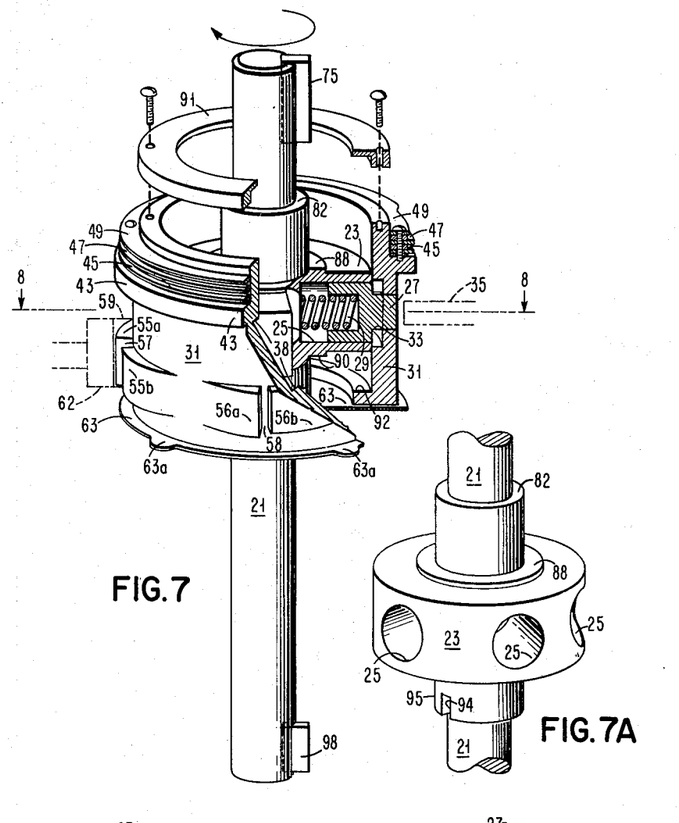
FIG. 7 is a perspective view partially broken away of the cycle indexing control coupling.
FIG. 7A is a perspective view of the shaft and hub portion of FIG. 7.

Referring to FIGS. 7 and 7A, five holes 25 have been bored radially into hub 23 and spaced 72° apart. In each hole 25 there has been provided a cycle index pin 27, each including a stem and shoulder portion 27a and 27b respectively (FIG. 8) and urged outwardly by a spring 29. Cycle control housing 31 includes a hole 33 drilled through the side wall thereof and arranged to receive the stem portion 27a of pins 27. Except for the fact that one of pins 27 has been engaged by hole 33, hub 23 would be free to rotate with respect to housing 31. A push type solenoid referred to as the index solenoid and represented in FIGS. 7 and 8 only by its armature 35 is provided to control the release of stem 27a from hole 33 in order to permit hub 23 to turn with respect to housing 31. Shaft 21 and hub 23 are continuously urged to rotate clockwise as viewed from above by a motor 39 acting through an overdriven clutch 41 or suitable coupling such as a friction clutch wherein motor 39 continues to operate notwithstanding the fact that shaft 21 is restrained, whereas release of shaft 21 causes it to be driven by motor 39. Ball bearings as described below have been omitted from FIG. 7 to more clearly view the structure.

Figure 8A:
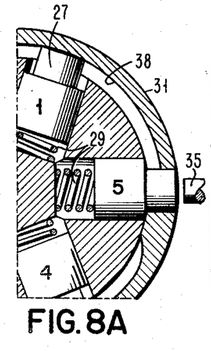
FIGS. 8A through 8D show a portion of the arrangement of FIG. 7 in section taken in a plane perpendicular to the axis of the arrangement in FIG. 7 at line 8—8 of FIG. 7 so as to show the operation of the index stepping pins.
Figure 8B:
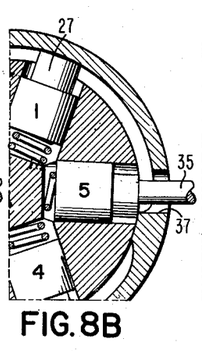
Figure 8C:
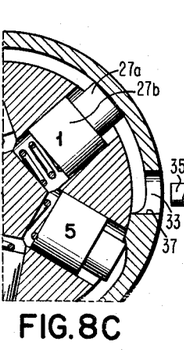
Figure 8D:
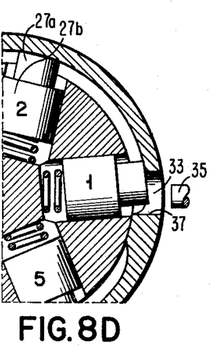

The advance of a particular pin 27 can best be understood by referring to FIGS. 8A through 8D, as well as to FIG. 9. With housing 31 held firmly in position by a detent blade 59 (described below), rotation of hub 23 with respect thereto is not possible since the No. 5 pin 27 is engaged by hole 33 (FIG. 8A). However, by energizing solenoid 35, the No. 5 pin will be pushed out of hole 33 and inwardly beyond the edge of a striking surface 37 (FIG. 8B). In this condition shaft 21, being continuously urged to rotate, will drive the No. 5 pin clockwise until the stem 27a of the No. 1 pin comes into contact with striking surface 37 (FIG. 8D). Surface 37 thus prevents any possibility that the next succeeding stem will overshoot hole 33 and fail to engage. As shown in FIGS. 7 and 8, there is a groove 38 formed circumferentially around the interior of housing 31 to form a race for the ends of stems 27a. Groove 38 is continuous with the exception of a short distance clockwise of surface 37 as viewed from above in FIG. 8. As thus linked together, shaft 21 can now drive housing 31 that cam surfaces on its exterior will operate the photographic cycle.

Figure 4:
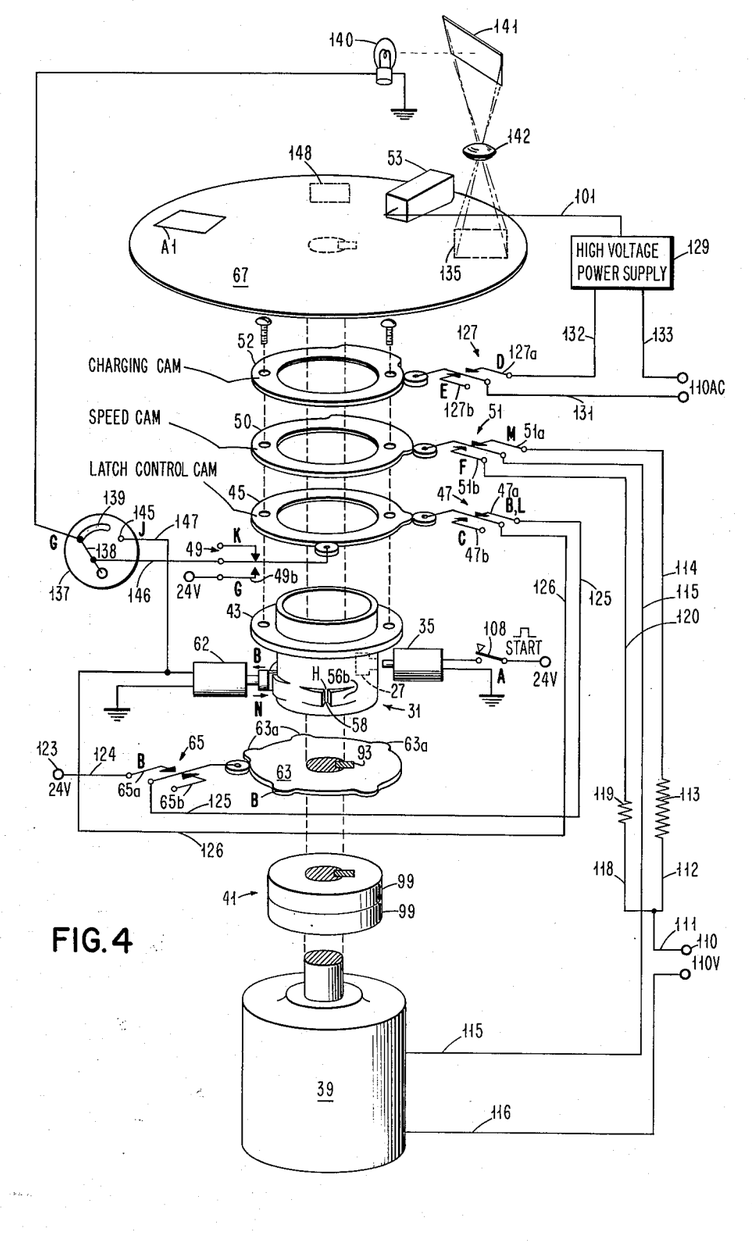
FIG. 4 is an exploded view of the invention schematically represented for demonstrating the operation of the invention. As shown the parts are arranged to locate an exemplary area A1 as drawn in solid lines for subsequent movement to the positions shown in phantom lines.

As shown in FIG. 7, housing 31 is provided with a flange 43. Directly above flange 43, three ring-like cams have been provided in spaced-apart relation and secured thereto. These cams are arranged to control various microswitches (FIG. 4). The bottom cam 45 controls a latch release switch 47 and a timing control switch 49. Cam 45 is referred to herein as a latch control cam. The middle cam 50 operates a speed control switch 51 for rotating shaft 21 at high or low speed during portions of the photographic cycle. Therefore, cam 50 has been referred to herein as the speed control cam. Finally, the top cam 52 controls a charging unit 53 at an appropriate point in the photographic cycle and therefore is described as a charging cam.

Figures 5, 6, 6A, 9A, 9B, 9C, 10A, 10B, 10C:
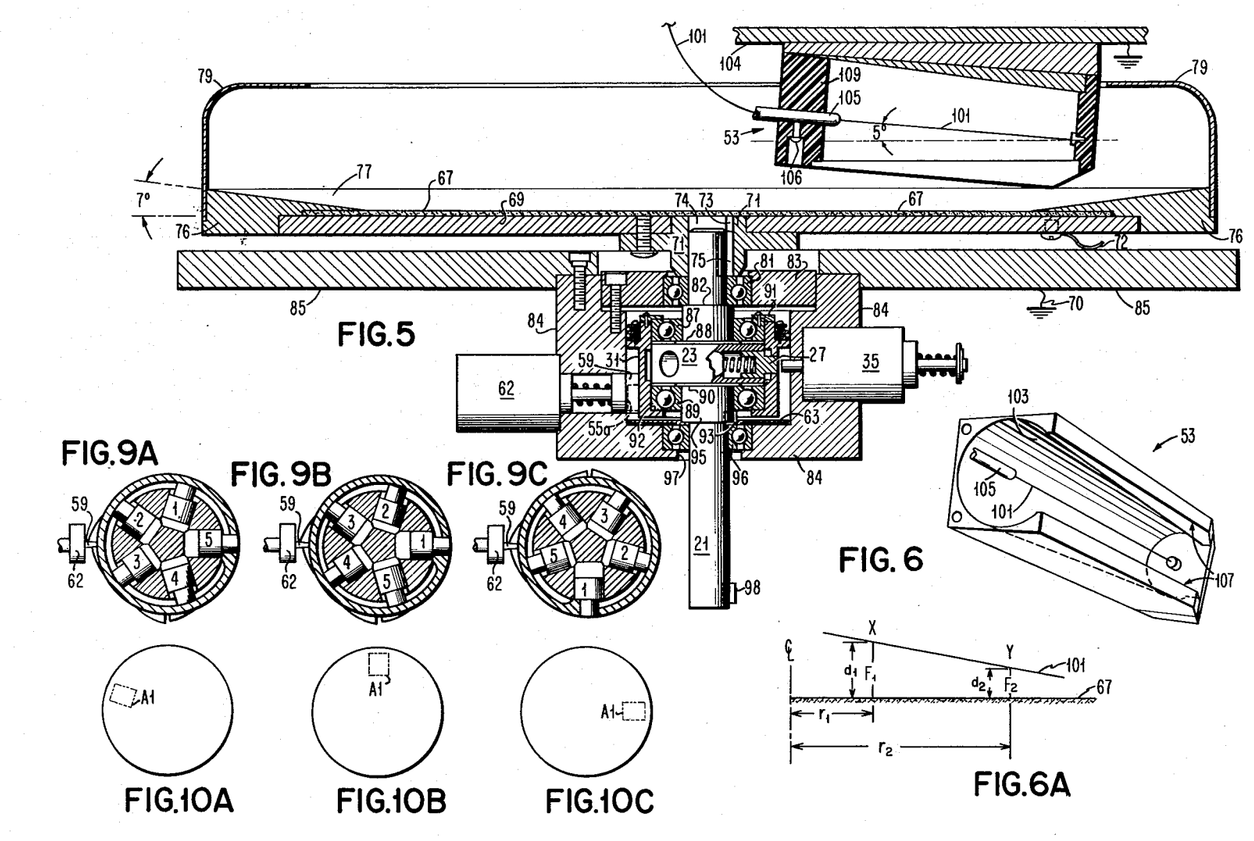
FIG. 5 shows the invention in its assembled condition, and in center line section along the line 5—5 of FIG. 2. However, the charging unit has also been shown in center line section to more clearly reveal its interior construction.
FIG. 6 is a perspective view of the electrostatic charging unit shown in FIG. 5 and turned on its axis to reveal the bottom thereof.
FIG. 6A schematically represents the operating principle of the charging unit in FIG. 6.
FIGS. 9A through 9C correspond with FIGS. 10A through 10C to show the relative relationship of parts of the coupling arrangement when a given image area is respectively at its home, precharge (and utilization) and expose positions respectively.

Below flange 43 it is to be noted that the exterior surface of housing 31 has been formed with two pairs of cam surfaces 55a, 55b and 56a, 56b. The two cam surfaces of each pair are spaced apart to provide a notch 57 and 58 respectively therebetween. Notches 57 and 58 coact with a blade 59 formed on the end of the armature 60 of a latch or solenoid 62. As more fully described below notch 57 when engaged by blade 59 prevents housing 31 from turning when a given image, for example, area A1, is in both the "home" and precharge (or utilization) positions, i.e. when area A1 is at roughly ten and twelve o'clock (FIG. 10). These conditions are shown respectively in FIGS. 9A and 9B as well as in 10A and 10B. The notch 58 engages blade 59 when this same image area A1 referred to above is positioned at the expose station (three o'clock) as shown in FIGS. 9C and 10C.

Beneath housing 31 and keyed to shaft 21 is an index pin position cam 63 which is provided with a number of lobes 63a equal to the number of pins 27 of hub 23. Each lobe 63a is associated with a pin 27 in a manner to close an interlock switch 65 in phase with insertion of the pin into hole 33. Thus, cam 63 controls interlock switch 65 to prevent latch solenoid 62 from releasing housing 31 at a time when hole 33 is not engaged by one of pins 27.

Having thus described the cycle index control coupling, the balance of the apparatus of the invention can now be more easily understood.

*Overall Structure*

Referring to FIG. 5, the apparatus of this invention is shown in its assembled condition and comprises a suitable photoresponsive surface 67 such as a photoconductive insulating plate of amorphous selenium. Surface 67 is bonded to a rotatable table 69 of conductive material and grounded as at 70 by a leaf spring wiper 72 secured to its underside. Table 69 is provided with a bushing 71 having a keyway 73 along its bore 74. Bore 74 slips over the upper end of shaft 21 provided with a key 75. As thus arranged, surface 67 is rotated by shaft 21 locked thereto. Around the periphery of table 69 and surface 67 and overlapping the circumference of the latter, there is provided an agitation member 76 having an inclined upper face 77. While the presence of agitation member 76 is not altogether necessary, it has been found that if the angle of face 77 with respect to surface 67 is approximately 7°, the cascading of the toner carrier beads is improved. The outer periphery of member 76 supports a retaining rim 79 which functions to collect or retain toner particles and carrier beads placed inside.

Bushing 71 rests upon the inner race of a ball bearing 81. Ball bearing 81 is held tightly against a shoulder 82 (FIG. 7A) on shaft 21 by a collar 83 screwed to a supporting body member 84. Body member 84 is secured, in turn, to a frame member 85, which could support the light-tight covers not shown. Ball bearings 87 and 89 (FIG. 5) have been provided both above and below hub 23 and the inner race of each of these bearings rests upon shallow shoulder portions 88 and 90 respectively as formed on opposite sides of hub 23. Note that in FIG. 7 the bearings have not been shown for purposes of clarity. However, as seen in FIG. 5, bearings 87 and 89 are held securely to hub 23 by a retaining ring 91 screwed tightly to the top of housing 31 and gripping only the outer race of bearing 87, while on the bottom of housing 31 there is formed a retaining lip 92 which, like ring 91, extends inwardly only insofar as to cover the outer race of bearing 89. As thus arranged, housing 31 is free to rotate with respect to hub 23 by releasing the pins 27 locking the two together. With a pin 27 engaging hole 33, hub 23 and housing 31 turn together as a unit.

Beneath lip 92 of housing 31 is located the pin position cam 63 previously described. Cam 63 is secured to shaft 21 by means of a key 93 (FIG. 5) formed integrally therewith and inserted into a keyway 94 (FIG. 7A) formed in stepped portion 95 of shaft 21. Consequently, cam 63 also turns with both shaft 21 and hub 23. Cam 63 has a bossed portion underneath which rests on the inner race of a ball bearing 96 so as to space cam 63 clear of the bottom interior surface of body member 84. A lip 97 is formed at the bottom of member 84 to retain bearing 96 and all structures resting thereon.

Solenoids 35 and 62 are mounted diametrically opposite each other in body member 84. Solenoid 35 is arranged to drive its armature leftward as shown in FIG. 5 to push stems 27a out of engagement with hole 33. Solenoid 62 when energized is arranged to withdraw blade 59 from either notch 57 or 58 for a period of time sufficient to let these notches move out from under blade 59 (under urging of motor 39 acting through clutch 41). From a comparison of FIGS. 9 and 10 as well as the foregoing description, it should be apparent that solenoid 35 controls the rotational advance of hub 23 with respect to housing 31 so as to bring a fresh image area of surface 67 into the photographic cycle while solenoid 62, on the other hand, controls the detenting or precise positioning of any given image area, for example, area A1 at various stages during the photographic cycle. Finally, the lower end of shaft 21 is provided with a locking key 98 for coupling shaft 21 to the upper face plate 99 of clutch 41.

Referring to the upper portion of FIG. 5, as well as to FIGS. 6 and 6A, there has been provided a charging unit 53 for applying a substantially uniform electrostatic charge to surface 67 to prepare surface 67 for exposure to a radiant energy pattern such as might be reflected from a document. Charging unit 53 is comprised of a single wire 101 tautly strung axially of a charge shielding chamber 103. The interior of chamber 103 it will be observed is shaped as a truncated cone, the end nearest the circumference of surface 67 being the smaller end. The angle at the apex of the cone is 9°. Thus, the half angle, i.e. the angle defining the divergence of wire 101 with respect to the wall of chamber 103 is 4½°. Wire 101 is mounted in insulated relationship to the grounded frame, shown only as member 104, by means of a support element 105 held in place by set screw 106. The ends of chamber 103 are closed off by a suitable insulating material 109 such as plastic. The longitudinal portion of chamber 103 is constructed of a suitable material such as aluminum. It is to be noted that chamber 103 has a longitudinal opening 107 of uniform dimension throughout. Charging unit 53 is supported from frame member 104 so that wire 101 will subtend an angle to surface 67 of approximately 5°. In this manner, the difference in linear speed between any two portions of surface 67 located at different radial distances from its center is satisfactorily compensated for. In the foregoing structure the attempt has been to provide a uniform rate of charging surface 67. It has been determined that this charging rate will depend upon several factors for a given voltage applied to the charging wire. These factors are: the electric field strength determined by electrode spacing, i.e. the spacing of wire 101 from image surface 67; the shield spacing from the charging wire; and the width of the gap formed in the shield. However, only the first two factors have been embodied in the preferred arrangement shown since it has been found that their effect on the ionizing rate is a more linear function than the effect produced by a uniformly diverging gap. (The wider the gap, the greater will be the charging rate). While it is possible that any one of these factors, taken alone, could produce a uniform charging rate for surface 67, the combined use of the first two factors has been preferred in order to minimize the angle of wire 101 with respect to surface 67 thereby aiding in the construction of the apparatus, e.g. a smaller unit is possible. However, the primary contribution toward a uniform rate is provided by the angled wire 101. Thus, in FIG. 6A at a point X, the spaced relation of wire 101 is represented by distance $d_1$ while at a point Y the spaced relation is represented by a distance $d_2$. Consequently, it can be seen that for the radial displacements $r_1$ and $r_2$ associated with points X and Y respectively, the field strengths $F_1$ and $F_2$ will vary inversely with the wire spacing and directly with the radial displacement.

Referring to FIG. 4, the several switches schematically represented are in practice supported by body member 84 (FIG. 5) and are for the most part located on the back side thereof. However, for purposes of clarity in illustrating the structure in FIG. 5, they have not been shown since it is believed one skilled in the art could easily supply such switches based on the showing in FIG. 4. The electrical circuits controlled by these various switches will be described as the operation of the invention proceeds.

*Machine Operation*

Figure 11:
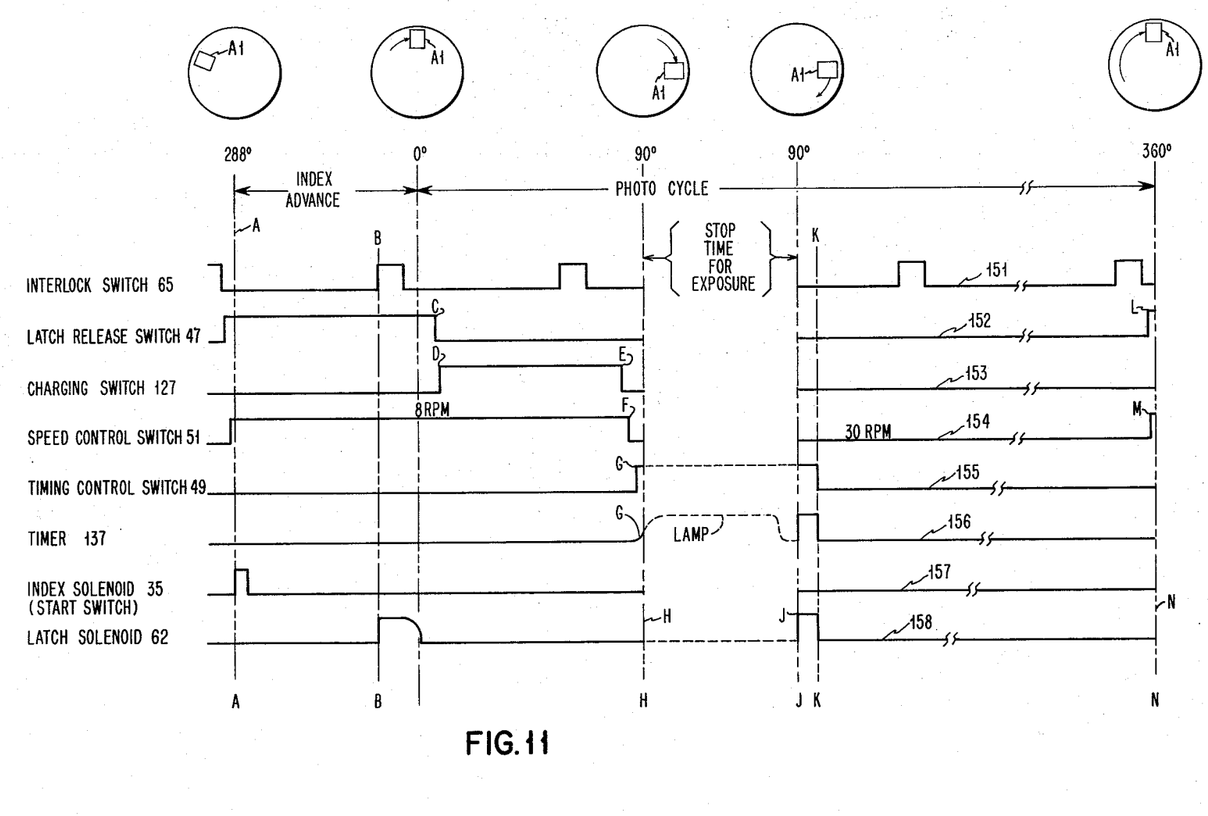
FIG. 11 is a timing diagram for the operation of the invention.

The operation of the apparatus of the invention will best be understood by referring to FIG. 4 as well as to the timing diagram of FIG. 11. The image area A1 will be used to demonstrate a complete cycle operation of the device. Furthermore, while the timing diagram discloses a machine sequence of operation, for ease in following through a machine cycle, alphabetic letters A, B, C, etc. (with the omission of the letter "I") have been associated with the various switches and controls in the sequence of their operation. These letters have also been shown in FIG. 11 to correlate the timing chart with the operation of the actual structures in FIG. 4. Furthermore, in FIG. 11, the approximate position of the exemplary area A1 is shown in relation to various times in the cycle of operation.

In FIG. 11 curves 151–158 represent respectively the operation of interlock switch 65, latch release switch 47 charging switch 127, speed control switch 51, timing control switch 49, timer 137, index solenoid 35 (or the action of start switch 108), and latch solenoid 62.

Throughout the following description when referring to the contacts of the various switches, as viewed in FIG. 4, the upper contact will be designated "a" and the lower contact will be designated "b," preceded by the reference numeral associated with the particular switch. For example, at the outset of a cycle of operation, as viewed in FIG. 4, the armature of switch 47 is closed upon contact 47a. Furthermore, it is to be understood that the armatures are all biased against their controlling cam surfaces.

A machine cycle commences with area A1 at 288° (as surface 67 is viewed from above). At the beginning of this cycle motor 39 is running at low speed, or approximately 8 r.p.m. The control circuit for motor 39 is traced from a 110 volt power supply terminal 110 along conductors 111 and 112, resistor 113, conductor 114 and switch 51 the armature of which is closed upon contact 51a by cam 50, and then via conductor 115 to the field winding of motor 39 and return via conductor 116. High speed operation of the motor is effected whenever the armature of switch 51 is permitted by cam 50 to close on its other contact 51b to complete a circuit from terminal 110, conductor 111, conductor 118, resistance 119, conductor 120, contact 51b, and return via conductors 115, field winding of motor 39, and conductor 116. As thus seen, cam 50 operates a switch 51 to effect either high or low speed operation of motor 39. The resistance values of resistances 113 and 119 are selected so that a larger voltage drop will occur across the speed control resistance 113 in the low speed circuit, than occurs in the resistance of the high speed circuit, i.e. resistance 119. This is explained by the fact that since the voltage drop between conductors 111 and 116 remains constant at 110 volts, the larger voltage drop across resistance 113 in the low speed circuit leaves less potential across the field winding of motor 39. On the other hand, greater potential is applied to the field winding of motor 39 in the high speed circuit due to the fact that a smaller voltage drop occurs across resistance 119. In the arrangement of this embodiment, the values for resistances 113 and 119 have been chosen with respect to the resistance of the field winding in motor 39, such that low speed operation drives surface 67 at about 8 r.p.m. while high speed operation has been established at approximately 30 r.p.m.

Prior to the commencement of a machine cycle, in addition to the fact that motor 39 is tending to turn shaft 21 at the low speed operation and switch 47 has been closed upon contact 47a by cam 45, interlock switch 65 remains open so that latch solenoid 62 is de-energized.

In order to start a machine cycle, a start switch 108 is closed (step A) sufficiently long to energize solenoid 35 for approximately 5° as seen on the timing chart in FIG. 11. Therefore, the armature of solenoid 35 will push the No. 5 pin 27 (FIGS. 8 and 9A) out of engagement with hole 33. Since the No. 5 pin 27 is the only thing holding hub 23 from rotating with respect to housing 31, hub 23 will turn with respect thereto until the No. 1 pin 27 falls into hole 33 (FIG. 9B). As hub 23 is released, pin position cam 63 begins to rotate with shaft 21 (and area A1). As image area A1 approaches approximately 345°, the armature of interlock switch 65 closes upon contact 65a by one of lobes 63a of cam 63 (step B). This completes a circuit from a 24 volt potential source coupled to terminal 123 via conductor 124, contact 65a, conductor 125, contact 47a, conductor 126, latch solenoid 62 and then to ground. Consequently, at the closing of switch 65 upon contact 65a, solenoid 62 is energized shortly after the No. 1 pin 27 (FIGS. 8D and 9B) engages hole 33 thereby driving housing 31 clockwise via hub 23 and commencing the photographic portion of the machine cycle.

Solenoid 62 is de-energized as soon as cam 45 has moved sufficiently to cause the armature of switch 47 to open contact 47a (step C). Shortly after housing has commenced turning, cam 52 moves the armature of a charging switch 127 to close with contact 127a (step D). In this condition, a conventional control circuit for operating a high voltage D.C. power supply 129, generating, for example, between 8000 and 9000 volts, is closed. This control circuit as schematically represented is traced from a low voltage source, for example, 110 volts via conductor 131, the armature of switch 127, contact 127a, conductor 132, a conventional power supply 129 and returning via conductor 133. Power supply 129, when energized, will impress its high voltage upon the single conductor 101 which can, for example, be a Corona discharge wire.

Referring to curve 153 on the timing chart of FIG. 11, surface 67 is charged by wire 101 during approximately the period 009° to 081°. During that time, interlock switch 65 (curve 151) has closed once under action of the next successive lobe of cam 63. However, since switch 47 (curve 152) was not closed, the closing of interlock 65 was of no effect. Thus after table 69 has rotated to about 081° (step E), the surface 67 has received a uniform electrostatic charge applied to image area A1. Approximately 3° later, speed cam 50 causes the armature of switch 51 to close upon contact 51b (step F) thereby switching motor 39 into high speed operation. By this time, blade 59 of solenoid 62 is just about to fall into notch 58 (step H). However, momentarily before blade 59 drops into notch 58 (step H) to arrest the rotation of surface 67 and hold image area A1 precisely in an exposure station, shown by reference numeral 135, a suitable timing device designated schematically by reference numeral 137 is started by cam 45 closing the armature of switch 49 upon contact 49b (step G). As schematically represented in FIG. 4, a wiper 138 of timer 137 commences moving along a conductive strip 139 to ignite a lamp 140 so that by the time blade 59 has settled in notch 58 to position area A1, lamp 140 will be illuminated sufficiently to commence dissipation of selected parts of the charge on surface 67.

As shown in FIG. 4, lamp 140 projects light against a photographic object, for example, a document 141 through a condensing lens 142 so that the pattern on the document 141 is focused upon image area A1 now at station 135. The duration of this exposure can be expected to range between 0.5 to 3.0 seconds depending upon various conditions. During the entire time that area A1 is located at station 135, the armature of switch 49 is closed upon contacts 49b. However, it will be noted that timer 137 has been arranged so that wiper 138 will extinguish lamp 140 momentarily prior to closing upon a contact 145 (step J). Closing contact 145 completes a circuit from contact 49b, conductor 146, wiper 138, contact 145, conductor 147, latch solenoid 62 and then to ground. This action energizes latch solenoid 62 which withdraws blade 59 from notch 58 thereby again permitting the recording surface 67 to continue its rotation, but at high speed (see step F). After a small amount of rotation, for example approximately 7°, solenoid 62 is de-energized (step K), and blade 59 falls against cam surface 56b. As housing 31 continues to rotate, area A1 passes through the lowermost point in its travel (see FIG. 3) and under an accumulation 160 of carrier beads mixed with toner particles thereby developing the latent electrostatic charge image previously formed at exposure station 135. During the remainder of the cycle, it will be noted that interlock switch 65 closes upon contact 65a several times but with no effect due to the fact that switch 47 is open during such times.

Rotation of table 69 continues at high speed substantially until blade 59 again falls into notch 57 (step N) to detent housing 31 with area A1 positioned precisely in registration at a utilization station designated 148. Here, the developed powder image can be illuminated, for example for viewing purposes, if desired. (Note however, that just prior to the arrival of area A1 at station 148, the armature of switch 47 again closes upon contact 47a (step L), but solenoid 62 is not energized since switch 65 is open.) Immediately prior to detenting area A1 at station 148, motor control switch 51 shifts motor 39 to low speed operation (step M) to lessen the impact of blade 59 with notch 57. Thus with the detenting of blade 59 the next subsequent machine cycle is ready to commence. The start of the next subsequent cycle may be delayed as long as desired as determined by the utilization to be made of the developed powder image.

In the foregoing operation, it should be noted that before area A1 again enters the photographic cycle, it will have passed through the developing particles and carrier beads four times. Thus, if the utilization of area A1 in its developed condition has included flooding it with radiant energy, for example for projecting purposes, the subsequent passage of this area several times through the carrier beads will have completely dislodged all particles adhering thereto so that it will be substantially erased by the time it is again ready for a photographic cycle. In the event that the utilization of the developed image does not incorporate flooding the area with radiant energy, as might be true where a contact transfer of the image is to be made, this additional flooding step can be easily incorporated merely by adding an additional cam and microswitch control at a position subsequent to utilization of the developed image.

In the foregoing manner then, no rocking is needed to develop and erase an image and the time required for erasure is eliminated from the photographic cycle except only insofar as the time necessary to advance a fresh image area into position to enter it into the photographic cycle.

While the invention has been particularly shown and described with reference to a preferred embodiment thereof, it will be understood by those skilled in the art that various other changes in the form and details may be made therein without departing from the spirit and scope of the invention. For example, while the invention has been described with relation to the formation of an electrostatic image its teaching can also be employed in the development of latent magnetic images as well.

What is claimed is:

1. Apparatus for developing an electrostatic charge distribution pattern comprising a rotatable table having a flat planar photoconductive insulating surface thereon, means for applying a substantially uniform electrostatic charge to a radially extending portion of said surface, said surface being arranged to receive a radiant energy pattern onto said portion to effectively discharge areas of said uniform charge thereby providing an electrostatic charge distribution pattern in said portion according to said radiant energy pattern, a rim enclosing said table and arranged to retain on said surface a quantity of finely divided toner particles and carrier beads, said surface being disposed at an angle to the horizontal sufficiently acute to accumulate said beads and particles at the lowermost region of said surface, motive means connected to move said portion substantially in the plane of said surface and through said accumulation prior and subsequent to receiving said radiant energy pattern onto said portion and means selectively operable to flood said portion with radiant energy.

2. Apparatus for developing an electrostatic charge distribution pattern comprising a rotatable table having a flat planar photoconductive insulating surface thereon, means for applying a substantially uniform electrostatic charge to a predetermined radially extending area of said surface, said surface being arranged to receive a radiant energy pattern onto said predetermined area to effectively discharge portions thereof thereby providing an electrostatic charge distribution pattern in said area according to said radiant energy pattern, a rim enclosing said table and arranged to retain on said surface a quantity of finely divided toner particles and carrier beads, said surface being disposed at an angle to the horizontal sufficiently acute to accumulate said beads and particles at the lowermost region of said surface, motive means connected to move said portion substantially in the plane of said surface and through said accumulation prior and subsequent to receiving said radiant energy pattern onto said predetermined area, means selectively operable to flood said portion with radiant energy, and means operatively associated with said table and constructed to precisely register said predetermined area for receiving said radiant energy pattern and for utilizing said area after development thereof.

References Cited in the file of this patent

UNITED STATES PATENTS

| | | |
|---|---|---|
| 1,722,573 | Hirsch | July 30, 1929 |
| 2,446,200 | Tait et al. | Aug. 3, 1948 |
| 2,885,955 | Vyverberg | May 12, 1959 |
| 2,982,647 | Carlson et al. | May 2, 1961 |
| 2,990,278 | Carlson | June 27, 1961 |
| 3,052,539 | Greig | Sept. 4, 1962 |
| 3,062,956 | Godichini | Nov. 6, 1962 |
| 3,093,039 | Rheinfrank | June 11, 1963 |

FOREIGN PATENTS

| | | |
|---|---|---|
| 201,301 | Australia | Mar. 19, 1956 |
| 723,534 | Great Britain | Feb. 9, 1955 |